United States Patent [19]
Regan

[11] Patent Number: 5,587,072
[45] Date of Patent: Dec. 24, 1996

[54] STORM SEWER OUTLET FILTER

[76] Inventor: Francis A. Regan, 211 Ardmore Ave., Ardmore, Pa. 19003

[21] Appl. No.: 541,619

[22] Filed: Oct. 10, 1995

[51] Int. Cl.$^6$ .................................................. B01D 35/02
[52] U.S. Cl. .............................. 210/232; 210/460; 404/2; 405/36
[58] Field of Search ..................... 210/163, 164, 210/166, 232, 459, 460, 461, 469, 474; 404/2, 4, 5; 405/36

[56] References Cited

U.S. PATENT DOCUMENTS

| | | | |
|---|---|---|---|
| 621,937 | 3/1899 | Neimann | 210/460 |
| 770,019 | 9/1904 | Neireiter | 210/459 |
| 3,108,065 | 10/1963 | McMichael | 210/460 |
| 3,633,757 | 1/1972 | Madern | 210/461 |
| 4,268,390 | 5/1981 | Cunningham | 210/232 |
| 4,935,132 | 6/1990 | Schaier | 210/163 |
| 5,372,714 | 12/1994 | Logue, Jr. | 210/164 |

*Primary Examiner*—W. L. Walker
*Attorney, Agent, or Firm*—Frederick J. Olsson

[57] ABSTRACT

A filter device made from netting mounted on the end of a storm sewer to receive the flow of water and debris carried by same and allow the water to flow on through while retaining the debris. The filter has multiple parts joined by quick release fasteners. The same fasteners connect the device to the storm sewer outlet.

11 Claims, 3 Drawing Sheets

STORM SEWER OUTLET FILTER

The invention relates in general to environmental protection devices and in particular relates to a device for reducing water pollution in streams, rivers, and the oceans due to debris dumped into the water from storm sewers.

More and more ground is being paved over by the creation of new streets and highways and in areas adjacent to new offices buildings, regional and local shopping centers, restaurants, apartment houses, sport complexes and the like. This paving has substantially aggravated the problem of debris being carried into storm sewers. The water runs along the paved surface and carries the debris with it into the storm sewer inlet.

The quantum of debris or litter increases as a function of paved over areas. Storm sewers almost always dump the water (and debris) into a stream, a river, or the ocean.

Debris in streams, rivers, and oceans is highly undesirable not only because it is unsightly but presents a danger to fish, animals, and humans. Moreover, debris sometimes extends for long distances along shore lines and along the banks of rivers and streams which makes for high clean up costs.

The idea in the invention is to capture the debris at the source, i.e. the storm sewer outlet and then periodically remove the captured matter.

The invention contemplates a multi-part filter device made of netting which can be attached to a storm sewer outlet so as to receive the flow of water and the debris carried by same and allow the water to flow on through while retaining the debris.

Preferably, the device is made of at least two parts which are releasably joined together and arranged to be releasably connected to the storm sewer outlet. This provides for quick removal of the device from the storm sewer outlet and also for separation of one part from an other either for replacement purposes or for removal of the collected debris.

The details of the invention will be described below in connection with the following drawings wherein.

Figure 1:
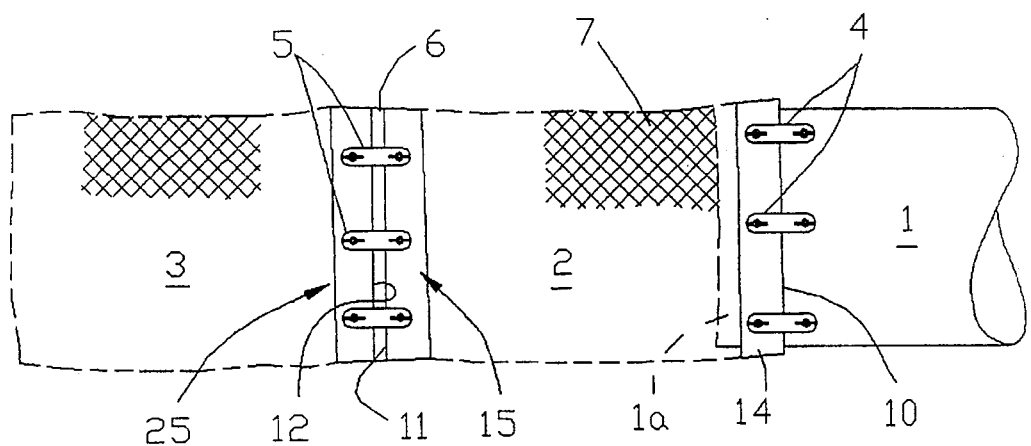
FIG. 1 is a side elevation view of the filter device of the invention.

Referring to FIG. 1, a typical storm sewer outlet in the formed of a pipe is indicated by the numeral 1, a first filter means is indicated by the numeral 2, and a second filter means is indicated by the numeral 3. The inlet or pipe 1 extends into the first filter means 2 as indicated by dotted lines 1a. The first filter means 2 is secured to the pipe or outlet 1 by the releasable fastener means 4, the structure of which will be noted later. The first and second filter means 2 and 3 are also secured together by the releasable fastener means 5 which preferably have the same structure as the fastener means 4. As will be observed, the filter means 2 and 3 are closely adjacent or abut one another as indicated by the joint 6.

The first filter means 2 has a knitted net construction with diamond shape holes as noted at 7. The second filter means 3 has the same construction. Typical netting and methods of fabrication are shown in U.S. Pat. No. 5,339,657. That patent discloses netting wherein the diamond shaped holes in a net are all of the same size or of different sizes and discloses methods by which such nets may be fabricated.

The first filter means 2 has an elongated, hollow form with a water/debris entrance end 10 and a water/debris exit end 11.

The second filter means 3 also has an elongated, hollow form with a water/debris entrance end 12 and a closed, opposite end 13.

At the entrance end 10 of the first filter means 2 there is a first connector means 14 which carries the releasable fastener means 4 and at the exit end 11 there is a second connector means 15 which carries the releasable fastener means 5.

The connector means 14 and 15 each carries an annular support (not shown in FIG. 1) which functions to maintain the entrance and exit ends of the filter means 2 in open condition. These annular supports will be described shortly.

Figure 3:
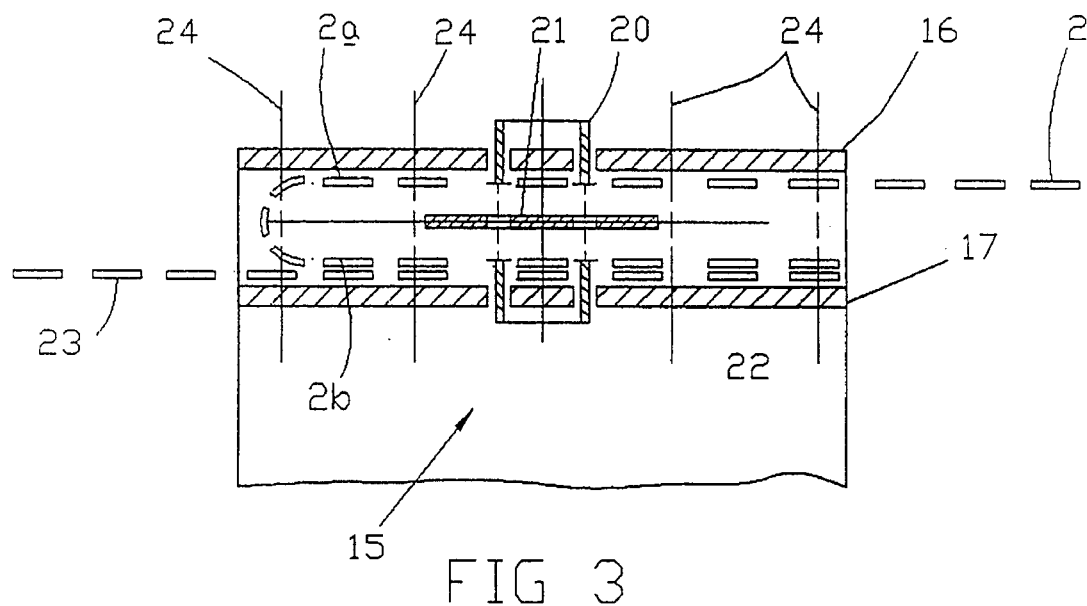
FIG. 3 is a fragmentary, elevational view of the structure of a connector means employed in the devices of FIGS. 1 and 2.

Referring now to FIG. 3, the structure of the connector means will be described. This will be done in connection with the second connector means 15. For purposes of description, FIG. 3 is shown in exploded form.

A pair of rings 16 and 17 are coaxially disposed. These rings are made of heavy, water resistant fabric such as nylon or polypropylene. Extending through the rings 16 and 17 is a tubular, stainless steel grommet 20 which is depicted in non-bent form. The rings 16 and 17 have openings to accommodate the grommet.

Between the rings 16 and 17 is an annular, stainless steel support 21 which has openings allowing the grommet to extend through the same.

Disposed within the piece rings 16 and 17 are the ends 2a and 2b of the netting of the first filter means 2. Naturally, the openings in the netting accommodate the grommet 20. Also 22 disposed in the space between the rings 16 and 17 is a part 22 of an annular overlap member 23. The purpose of the overlap 23 will expand later.

When the parts of the second connector means 15 are set up as described, the assembly is joined together by nylon stitching applied at least in the position indicated by the lines 24. Also the ends of the grommet are bent over respectively against the rings 16 and 17.

The first connector means 14 has the same structure as the second connector 15 expect that the overlap member is omitted.

At the entrance end 12 of filter means 3 there is a third connector means 25 which along with the second connector carries the releasable fastener means 5. The third connector means 25 has the same structure as the first connector means Annular support means (like the support 21) may be omitted from the connector means 14 and 25 since the open condition will be maintained by the pipe and the annular support in the connector means 15.

When the first and second filter means 2 and 3 are positioned as shown the overlap 23 extends across the joint 6 into the interior of the second filter means. The purpose of the overlap 23 is to prevent debris from exiting through the joint 6. Preferably, the overlap is made from netting.

Figure 2:
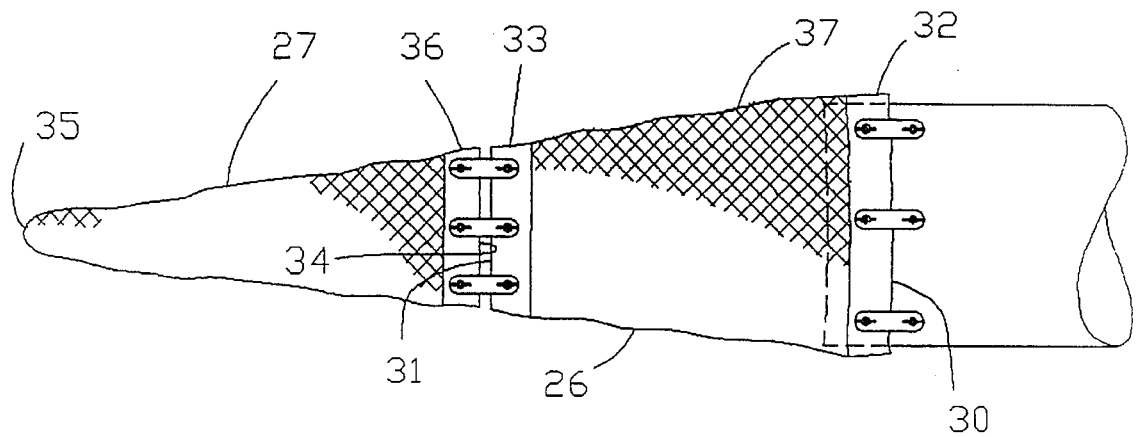
FIG. 2 is a side elevation view of a filter device of the invention which is tapered in the direction of water flow.

As depicted in FIG. 1 the filter means 2 and 3 have substantially the same diameter. The invention contemplates that the filter means each have a general conical shape as depicted in FIG. 2 for the first filter means 26 and second filter means 27. The entrance end 30 of the filter means 26 is of larger diameter then the exit end 31. The connector means have the same structure as described for the connector means in FIG. 1 except that the connector 32 is of larger diameter then the connector 33.

The filter means 27 has an entrance end 34 and a closed end 35 and a connector meads 36 at the entrance end. The connector means 33 and 36 are substantially the same diameter.

In FIG. 2, the netting 37 which form the filter 26 has the usual diamond shaped holes. However, the netting is fabricated so that the holes are progressively smaller in size extending in the direction from the entrance end 30 to the exit end 31.

The netting which forms the filter means 27 has the same progressively smaller hole structure.

The invention contemplates that devices described in connection with FIGS. 1 and 2 include netting fabricated so the holes in two axially extending sections (top and bottom as depicted in FIG. 1 and 2) have distinctly different size holes. For example in FIG. 1, the section above a horizontal plane containing the axis of device has holes which are larger then the holes in the section below the same plane.

The larger holes are advantageous where there is a lengthy period between inspections and during that period there is an unusually large amount of debris flowing out of the storm sewer. To avoid the filter device being jam-packed and the debris backing up into the sewer outlet, the large holes allow some debris to escape and thereby avoid the back up condition.

The invention finds utility in applications where the storm sewer outlet is substantially above the storm sewer run off.

Figure 5:
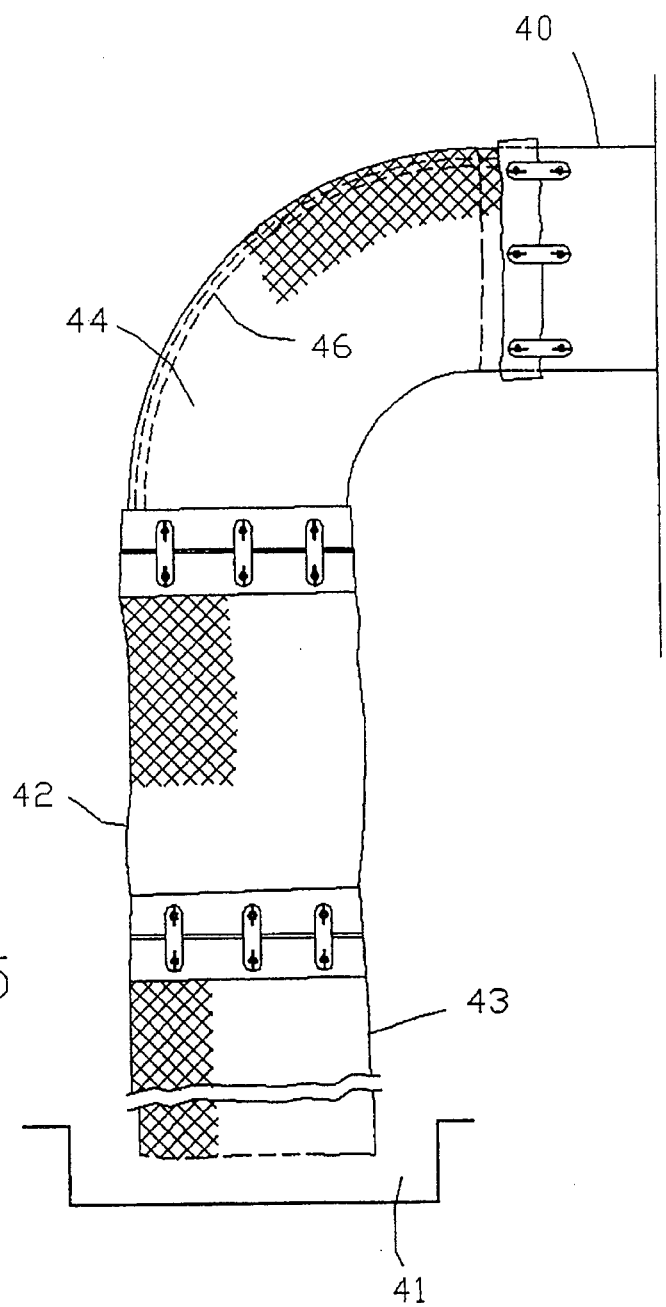
FIG. 5 is a side elevational view of the filter of the invention of use with an elevated storm sewer outlet.

This depicted in FIG. 5 when the outlet 40 is above the run-off 41.

Figure 6:
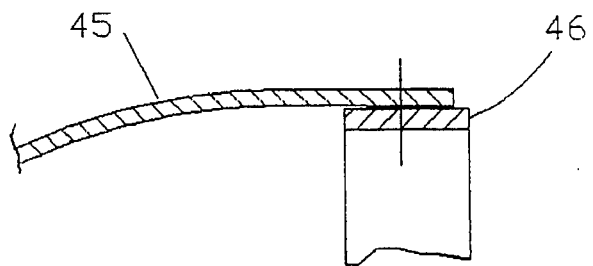
FIG. 6 is a fragmentary, sectional view illustrating a support used in the filter of FIG. 5.

The filter means 42 and 43 have the same structure as the filter means 2. The filter means 44 is similarly constructed except that it has a arcuate shape. To maintain the accurate shape a bent rod or strip 45 is joined to the support 46 as noted in FIG. 6. The support 46 is the same structure as described for the support 21.

Figure 4:
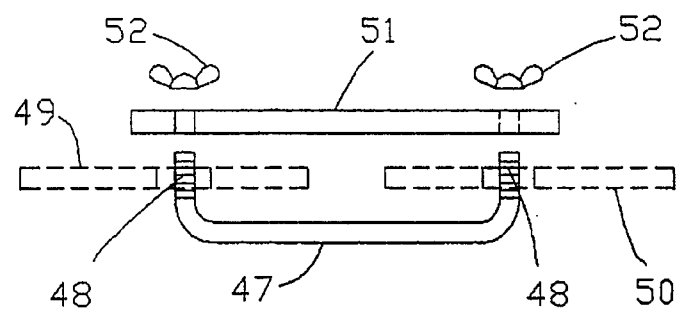
FIG. 4 is a sectional view of a form of a releasable fastener means employed in the devices of FIGS. 1 and 2.

The structure of the releasable fastener means 4 and 5 1s shown in FIG. 4.

A U-shaped rod 47 has threaded ends 48. The threaded ends 47 are adapted to fit up through the grommets (not shown) in adjacent connector means 49 and 50. A strap 51 has openings to fit over the threaded ends against connector means. The strap 51 is held in place by the wing nuts 52. With respect to using the releasable fastener means between the outlet and the connector, the outlet pipe is fitted with "eyes" which simulate a grommet. The latter is advantageously accomplished by providing an adjustable diameter stainless steel ring having radially projecting, threaded studs mounted to have some circumferential adjustment.

Where the outer edge of the outlet pipe is flush with the surrounding medium (such as concrete), tapped holes can be formed around the outer edge of the pipe and fitted with z-shaped studs, one leg being threaded and the other having an "eye".

I claim:

1. A filter device to be connected to the outlet of a storm sewer to receive the flow of water and debris carried by the water which exits from the outlet, the filter functioning for allowing the water to pass therethru while retaining debris carried by the water, the filter device comprising;

first filter means including an elongated, hollow member made of netting and having a water/debris entrance end and also having a water/debris exit end, the netting being open to pass water therethrough;

first connector means mounted on said netting and extending around said entrance end;

mechanism mounted on said first connector means for use in connecting the entrance end to a storm sewer outlet;

second connector means mounted on said netting and extending around said exit end;

mechanism mounted on said second connector means for use in connecting the exit end to an adjacent filter means;

second filter means including an elongated, hollow member made of netting and having a water/debris entrance end, the netting being open to pass water therethrough and also having an opposite closed end;

third connector means mounted on said netting of said second filter means and extending around the entrance end of said second filter means;

mechanism mounted on said third connector means for use in connecting last said entrance end to the exit end of said first filter means; and a plurality of releasable, reusable fastener means respectively engaging said mechanism or said exit end of said first filter means: and said mechanism on said entrance end of said second filter means and releasably securing the first and second filter means together with the ends of said second and third connector means adjacent to and facing one another and constituting a joint.

2. The filter device of claim 1 further including overlap means connected to said exit end of said first filter means and extending into said second filter means and across said joint therebetween to prevent debris from exiting thru said joint.

3. The filter device of claim 1 wherein:

the entrance end of said first filter means is larger in diameter than the exit end of the first filter means and the entrance end of said second filter means has substantially the same diameter as the exit end of the first filter means and the closed end of said second filter means has a smaller diameter then the entrance of the second filter means.

4. The filter device of claim 1 wherein:

the netting of said first filter means has diamond shaped holes and is formed so that the size of the diamond shaped holes are progressively smaller in size extending from the entrance end to the exit end; and the netting of said second filter means has diamond shaped holes and the size of the holes are progressively smaller in size extending from the entrance end to the closed end.

5. The filter means of claim 1 wherein:

said elongated member of said first filter means is formed with first and second sections each extending between said entrance end and said exit end of said first filter means;

the netting of the elongated member of said first filter means is formed with diamond shaped holes; and the holes in said first section being larger in size than the holes in said second section, the sections providing that when the filter device is in use with the elongated member extending generally horizontally, large holes of the first section are above the smaller holes in the second section.

6. The filter device of claim 1 wherein said mechanism on said first connector means, said mechanism on said second connector means, said mechanism on said third connector means each respectively include a plurality of releasable fastener means.

7. The filter device of FIG. 1, wherein:

said first filter means is arcuate in shape with the water/debris entrance end and the water/debris exit end being oriented substantially at right angles to each other and further including an elongated arcuate support one end of which connected to said first connector means and the opposite end is adjacent said second connector means.

8. A filter device to be connected to the outlet of a storm sewer to receive the flow of water and debris carried by the water which exits from the outlet, the filter functioning for allowing the water to pass therethru while retaining debris carried by the water, the filter device comprising;

first filter means including an elongated, hollow member made of netting and having a water/debris entrance end and also having a water/debris exit end;

first connector means extending around said entrance end;

mechanism mounted on said first connector means for use in connecting the entrance end to a storm sewer outlet;

second connector means extending around said exit end;

mechanism mounted on said second connector means for use in connecting the exit end to an adjacent filter means;

an annular support mounted on said second connector means and functioning to maintain the exit end of said first filter means in open condition;

second filter means including an elongated, hollow member made of netting and having a water/debris entrance end and also having an opposite closed end;

third connector means extending around the entrance end of said second filter means;

mechanism mounted on said third connector means for use in connecting last said entrance end to the exit end of said first filter means; and a plurality of releasable fastener means respectively engaging said mechanism on said exit end of said first filter means and said mechanism on said entrance end of said second filter means and releasably securing the first and second filter means together with the ends of said second and third connector means adjacent to and facing one another and constituting a joint.

9. In combination, a filter device and a plurality of releasable fastener means, the filter device to be connected to receive the flow of water and debris carried by the water which exits from the outlet of a storm sewer, the filter device functioning to allow the water to pass therethru while retaining debris carried by the water;

filter means including an elongated, hollow member made of netting and having a first end and also having a second end;

said netting being made with diamond shaped holes which function to pass water while retaining debris carried by the water;

first connector means extending around said first end;

mechanism mounted on said first connector means for use in receiving releasably fastener means;

second connector means extending around said second end;

mechanism mounted on said second connector means for use in receiving releasable fastener means; and a plurality of releasable fastener means respectively engaging said mechanism on said first end and on said second end.

10. The combination of claim 9 wherein at least one of said connector means mounts an annular support providing for the one connector means to maintain its end in open condition.

11. The combination of claim 9 wherein each of said connector means mounts an annular support, each support providing for the end of its connector means to be in open condition.

* * * * *